United States Patent [19]

Woodhams

[11] B 3,924,660

[45] Dec. 9, 1975

[54] DISTRIBUTION VALVE FOR DENTAL EQUIPMENT

[75] Inventor: Glen Arthur Woodhams, Rochester, N.Y.

[73] Assignee: Sybron Corporation, Rochester, N.Y.

[22] Filed: June 22, 1973

[21] Appl. No.: 372,823

[44] Published under the Trial Voluntary Protest Program on January 28, 1975 as document no. B 372,823.

[52] U.S. Cl. .............................. 137/637.1; 251/295
[51] Int. Cl.[2] .................. F16K 31/00; F16K 31/44; F16K 35/14
[58] Field of Search ..................... 32/22, 28, DIG. 3; 137/594, 595, 637, 637.1; 251/295

[56] References Cited
UNITED STATES PATENTS

| | | | |
|---|---|---|---|
| 2,098,682 | 11/1937 | Ward et al. | 137/637.1 |
| 3,088,490 | 5/1963 | Rockwood et al. | 137/637 |
| 3,158,178 | 11/1964 | Fiala et al. | 251/295 |
| 3,348,577 | 10/1967 | Miller et al. | 137/637.1 |
| 3,473,779 | 10/1969 | Gustafson et al. | 251/295 |
| 3,476,153 | 11/1969 | Roland | 251/295 |
| 3,487,853 | 1/1970 | Kern | 137/637.1 |
| 3,489,390 | 1/1970 | Cadogan | 251/295 |
| 3,574,308 | 4/1971 | Battersby | 137/637 |
| 3,726,013 | 4/1973 | Page | 32/22 |
| 3,779,283 | 12/1973 | Hohulin | 137/637 |

*Primary Examiner*—Martin P. Schwadron
*Assistant Examiner*—George L. Walton
*Attorney, Agent, or Firm*—Theodore B. Roessel; Roger Aceto

[57] ABSTRACT

Disclosed is a manually operated distribution valve for dental equipment and the like which is capable of selectively delivering a plurality of utility services such as power air, water and cooling air to anyone of several dental instruments. One manually operated switch is associated with each instrument for simultaneously turning on or off all of the utility services supplied to that one instrument. When any one switch is moved to the "on" position, a system of levers and linkages automatically moves all other switches to the "off" position so that utility service can only be supplied to one dental instrument at any one particular time.

4 Claims, 3 Drawing Figures

DISTRIBUTION VALVE FOR DENTAL EQUIPMENT

BACKGROUND OF THE INVENTION

The present invention relates generally to distribution valves for dental equipment and the like, and more specifically to a manually operated valve for controlling the flow of utilities such as air and water to a dental instrument such as a handpiece.

Various dental instruments, particularly dental handpieces, require several utilities for operation, as for example, power air to drive the handpiece and a supply of cooling air and/or cooling water. In present day dentistry, the dentist usually works with two or three handpieces including at least one high-speed handpiece and one low speed handpiece and an extra high or low speed handpiece depending upon the preferences of the dentist.

In order to supply utility services to all the handpieces, the main utility lines are usually connected to a manifold which in turn distributes the utilities to the appropriate dental instruments. In the usual case, there is an electrical switch associated with each instrument. When the instrument is withdrawn from its holder the switch opens and closes various solenoid valves to insure that utility services are delivered only to the instrument which has been selected for use. Such an arrangement requires one solenoid valve for each utility line connecting the instrument to the manifold. In the physical situation described above where three dental handpieces are employed, each handpiece requiring three different utilities as many as nine solenoid valves may be required. The size of solenoids are such that the switching apparatus in this case becomes rather bulky and does not lend itself to incorporation into a rather compact unit.

A further drawback in such electrically controlled apparatus is that the dental instrument is theoretically connected to its utility supplies as soon as the instrument is withdrawn from its holder. Thus, some sort of override switch is needed to protect against more than one handpiece being actuated when two are withdrawn from their holder's. Such a situation would exist, for example, where the dentist is using one handpiece and his assistant has withdrawn another to change burrs. Here, in particular, an override is needed to prevent injury to the assistant.

These and other drawbacks of the prior art are overcome by the present invention which provides a mechanical means for manually operating the valves which control the flow of air and water to the instrument. The arrangement allows the instrument to be activated i.e. connected to the utilities before or after the instrument is withdrawn from its holder. The use of mechanical means to operate the various valves greatly simplifies the solenoid valve arrangement of the prior art and makes the apparatus more reliable, less bulky, and reduces its cost. Further, a system of lever and linkages between the various valves insures that activating one dental instrument automatically deactivates all the other instruments.

SUMMARY OF THE INVENTION

The present invention may be characterized in one aspect thereof by the provision of a manifold having a single inlet for each of a plurality of utility services and a plurality of valved outlets for each of the services, the outlets being grouped in sets corresponding to the number of instruments to be serviced; manually operable means for simultaneously opening all the valved outlets in one of the sets; and a lever and linkage means between each of the sets operable to close all of the valved outlets in one set when the manual means is operated to open all of the valved outlets in another set.

OBJECTS OF THE INVENTION

One object of the present invention is to provide a manually operated control system for a dental unit.

Another object of the present invention is to provide a control system for dental units capable of supplying a plurality of utility services to any selected one of several dental handpieces.

A further object of the present invention is to provide a manual control system for dental units wherein manually depressing a lever for supplying utility services to a selected handpiece will automatically shut off the flow of utility service to any previously selected handpiece.

These and other objects advantages and characterizing features of the present invention will become more apparent upon consideration of the following detailed description thereof when taken in connection with the accompanying drawings depicting the same.

DESCRIPTION OF THE PREFERRED EMBODIMENTS

Figure 1:
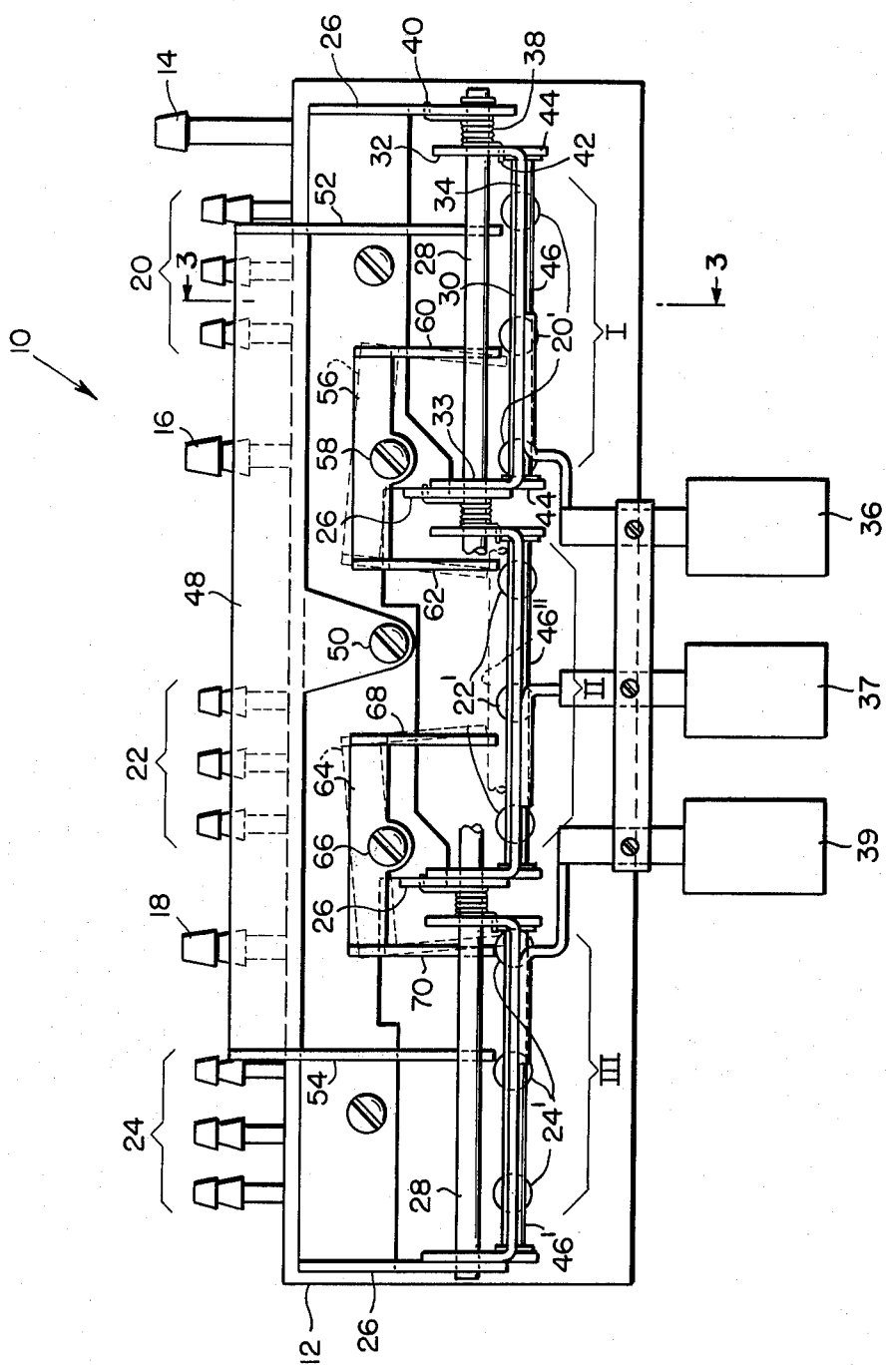
FIG. 1 is a plan view of the distribution valve of the present invention.

Referring to drawings, FIG. 1 shows the distribution valve generally indicated at 10 to include a manifold block 12 having inlets 14, 16 and 18 for power air, cooling air and water respectively.

For purposes of illustration only, the present invention will be described as if the manifold block were intended to service three handpieces. Accordingly, the block has three sets of utility service outlets 20, 22 and 24, wherein each set has an outlet for power air, an outlet for cooling air, and an outlet for water. The valves for each of these outlets are in the manifold block and have not been shown except for their actuating stems shown at 20', 22' and 24'. In order to simultaneously open all the valves in each set of outlets, a valve actuator is provided for each set of valved outlets. These actuators labeled I, II and III are associated with valve stems 20', 22' and 24' respectively.

Figure 2:
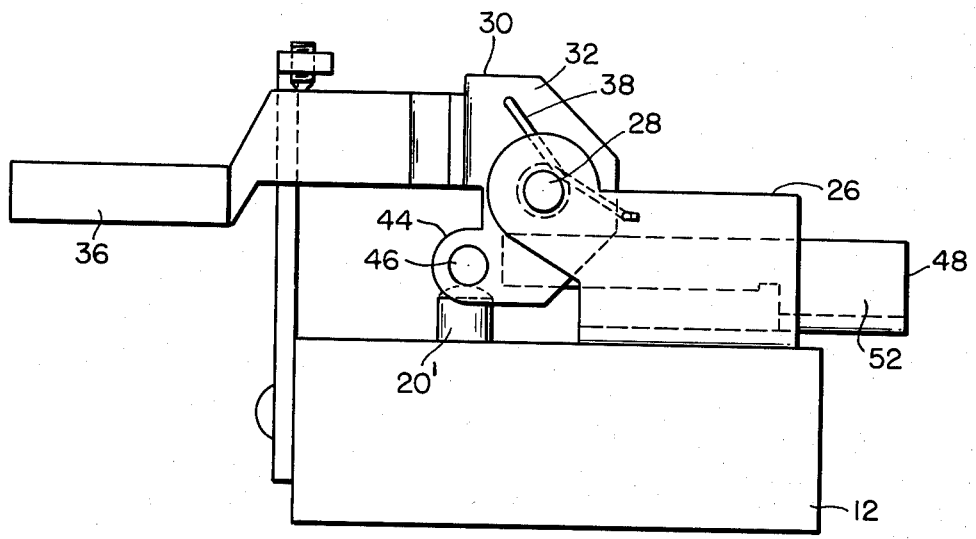
FIG. 2 is a side elevation view of the valve on a larger scale.

As shown in FIG. 1 and 2, manifold block 12 carries four spaced upstanding bracket members 26. Extending between and supported by these bracket members is a rod 28. Carried by rod 28 between the spaced brackets are three substantially identical valve actuators, one associated with each of the valve sets and labeled, as set out above I, II and III. As each of the valve actuators are substantially identical, only one will be described in detail.

Each actuator includes a bracket 30 generally U-shaped in plan view. This U-shaped bracket has its parallel legs 32, 33 pivotally mounted on support rod. 28. Attached to the base leg 34 of the U-shaped bracket is an actuating lever 36 which can be manually depressed to rotate bracket 30 about support rod 28, from the position shown in FIG. 2 to the position shown in FIG. 3. A coil spring member 38 is disposed about support rod 28 and has its ends 40, 42 attached respectively to bracket 26 and bracket leg 32 for purposes of assisting in returning the lever from the position shown in FIG. 3 to the position shown in FIG. 2.

Figure 3:
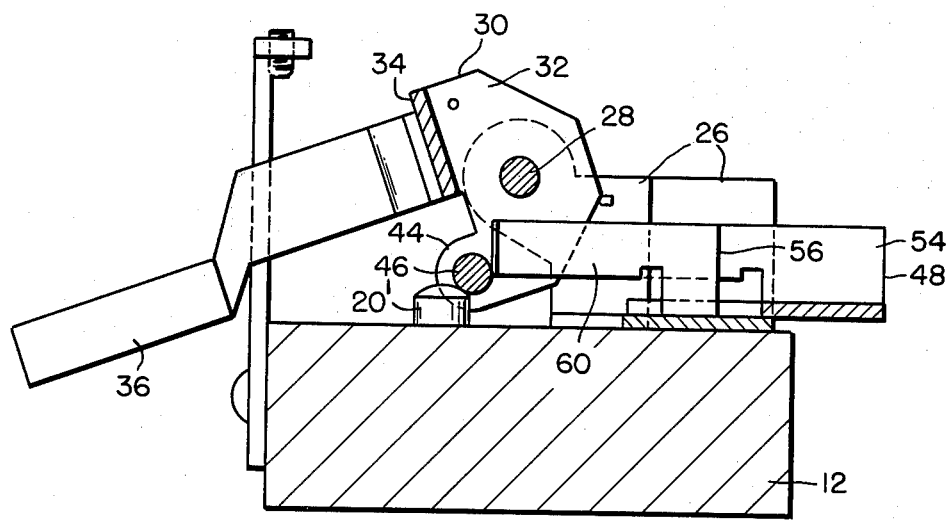
FIG. 3 is a view similar to FIG. 2 showing a section taken along line 3—3 of FIG. 1 and showing the valve in a different operative position.

Each parallel leg 32, 33 of the U-shaped bracket includes a depending crank arm portion 44 best seen in FIGS. 2 and 3. Extending between these crank arm portions is an actuating rod 46. This rod is positioned to extend across and engage each of the valve stems 20'. As shown in FIGS. 2 and 3, depressing lever 36 causes U-shaped bracket 30 to pivot about rod 28. This in turn drives actuating rod 46 in an arc down and across all of the valve stems 20' so as to simultaneously depress the valve stems and open all of the valved outlets 20. With the rod now located off center from the valve stems as shown in FIG. 3, an over center locking arrangement exists which prevents the return of lever 36 to the position shown in FIG. 2.

Completing the distribution valve assembly is a system of levers and linkages designed to automatically close all the valves in two sets when the third set is opened. This arrangement, then, prevents delivery of utility service to more than one dental handpiece at any one time.

Included in this lever and linkage system is a first lever 48 pivoted to the manifold block at 50. Lever 48 is formed with two parallel arms 52 and 54. Arm 52 is associated with the actuating rod 46 of set I and arm 54 is associated with an actuating rod 46' of set III. A second lever 56 pivoted to the manifold block at 58 has its parallel arms 60 and 62 associated respectively with actuating rod 46 of group I and an actuating rod 46'' of group II. A third lever 64 pivoted to the manifold block at 66 has its two parallel arms 68 and 70 associated respectively with actuating rod 46'' of group II and actuating rod 46' of group III.

In operation depressing, say, lever 36 will move this lever from the position shown in FIG. 2 to the position shown in FIG. 3. This in turn, drives actuating rod 46 down and across valve stems 20' so that all the valves in group I associated with outlets 20 are open simultaneously to deliver the necessary utility supplies to the particular dental handpiece associated with lever 36. As set out above, the position of rod 46 off the center of the valve stem enables the lever down to keep the valves open. As actuating rod 46 moves back across valve stems 20', it engages leg 52 of lever 48 and leg 60 of lever 56. This moves these levers slightly counter clockwise about their respective pivots 50 and 58.

Should the dentist or his assistant desire to actuate a different dental handpiece, the lever associated with that handpiece is simply depressed. If, for example, the center lever 37 is depressed, it will pivot actuating rod 46'' down and across all valve stems 22' to the position shown in dotted line in FIG. 1 so that utility service is started through outlets 22. As rod 46'' moves to this position, it in turn engages legs 62 and 68 of levers 56 and 64 respectively. This causes lever 56 to rotate clockwise about its pivot 58 as shown in dotted line which in turn moves leg 60 against actuating rod 46 for pushing the rod back over the center of the valve stems to the position shown in FIGS. 1 and 2. The movement of the rod back to this position is assisted by the spring force of spring 38. With rod 46 back in the position shown in FIG. 2, all valve stems 20' are released so that flow of utility service through outlets 20 is terminated.

If, instead, lever 39 is depressed, actuating rod 46' will pivot down and across all valve stems 24' so that utility service is started through outlets 24. As rod 46' moves to this position, it engages legs 54 and 70 of levers 48 and 64 respectively. Lever 48 would rotate clockwise causing its leg 52 to move against actuating rod 46 for pushing the rod back to the position shown in FIG. 1.

If lever 37 was previously depressed subsequent depression of lever 39 would cause lever 64 to rotate clockwise. This would drive leg 68 against actuating rod 46''. Causing the rod to move off of and release valve stems 22'.

Thus, it should be appreciated that depressing any lever 36, 37 or 39 will cause any previously depressed lever to move to a position illustrated in FIG. 1. In this manner, utility service will not be directed through more than one set of outlets 20, 22, or 24 at any one time. Any switching of utility service from one handpiece to another can be accomplished quickly and easily without the use of solenoids or other electrical components.

Having thus described this invention in detail, what is claimed as new is:

1. A manually operated distribution valve for selecting the simultaneous delivery of a plurality of utility services to one or another of several dental handpieces wherein operation to deliver the services to one instrument automatically terminates delivery to all other instruments, said valve comprising:
   a. a manifold block having a single inlet and a plurality of outlets for each utility service, the outlets being grouped in sets so that each set has one outlet for each service;
   b. each outlet being valved and having a valve operating stem extending up through said manifold block said stems being aligned along said manifold block;
   c. a manually operated lever associated with each set of outlets, said lever being pivoted about an axis located above and along said valve stems;
   d. an actuating rod carried by each lever, said rod being moved down and across the valve stems in one set to move the valves therein to an open position when the lever associated with that set is manually pivoted about its axis; and
   e. linkage means between said sets and cooperating with said actuating rods for closing the valves in one set when the valves in another set are opened said linkage means including a plurality of levers, one located between each pair of valve sets so that opening any one set will automatically close another previously open set, each of said levers being generally U-shaped with the base of the U-shape being pivoted to said manifold block and each leg of said U-shape being adapted to engage the actuating rods of adjoining sets.

2. A distribution valve as set forth in claim 1 wherein said actuating rod in said valve open position provides an over center locking arrangement for holding said valves in said open position when said manually operated lever is released.

3. A distribution valve as in claim 1 wherein said axis is formed by a single rod, said rod being supported there along by spaced brackets fixed to said manifold block, the valve stems for one set of valved outlets being disposed in a space between said space brackets.

4. A distribution valve as in claim 3, wherein each of said actuating rods is supported at the end thereof by a crank arm journaled to and depending from said single rod.

* * * * *